(12) United States Patent
Rinke (10) Patent No.: US 6,715,992 B2
(45) Date of Patent: Apr. 6, 2004

(54) HELICOPTER BLADE AND METHOD OF MANUFACTURE

(75) Inventor: Joseph P. Rinke, Ray, MI (US)

(73) Assignee: R & M Technology, LLC, Roseville, MI (US)

( * ) Notice: Subject to any disclaimer, the term of this patent is extended or adjusted under 35 U.S.C. 154(b) by 0 days.

(21) Appl. No.: 10/116,169

(22) Filed: Apr. 3, 2002

(65) Prior Publication Data

US 2002/0187047 A1 Dec. 12, 2002

Related U.S. Application Data

(60) Provisional application No. 60/281,494, filed on Apr. 4, 2001.

(51) Int. Cl.[7] .............................................. B64C 11/26
(52) U.S. Cl. ..................................... 416/230; 29/889.62
(58) Field of Search ................................. 416/230, 226, 416/245; 29/889.61, 889.6, 889.71, 889.72, 889.721, 889.722; 156/245, 156, 242, 285; 264/258

(56) References Cited

U.S. PATENT DOCUMENTS

| | | | | |
|---|---|---|---|---|
| 4,335,182 A | * | 6/1982 | Brand et al. ............. 428/319.3 |
| 4,622,091 A | * | 11/1986 | Letterman .................... 156/286 |
| 4,806,077 A | * | 2/1989 | Bost ............................. 416/226 |
| 4,935,277 A | * | 6/1990 | Le Balc'h ..................... 428/71 |
| 4,990,205 A | * | 2/1991 | Barbier et al. .............. 156/242 |
| 5,248,242 A | * | 9/1993 | Lallo et al. .................. 416/226 |
| 5,462,408 A | * | 10/1995 | Coffy ...................... 416/134 A |
| 5,547,629 A | * | 8/1996 | Diesen et al. ............... 264/257 |
| 5,855,709 A | * | 1/1999 | Bocoviz et al. ................ 156/84 |
| 6,139,942 A | * | 10/2000 | Hartness et al. ......... 428/298.1 |
| 6,156,682 A | * | 12/2000 | Fletemier et al. ........... 442/394 |

* cited by examiner

Primary Examiner—Edward K. Look
Assistant Examiner—J. M. McAleenan
(74) Attorney, Agent, or Firm—Howard & Howard (57) ABSTRACT

An aerodynamic blade 12 and method of manufacture wherein the blade includes a tip 14, a root 16, materials comprising skins 18A, 18B, reinforcement strips 20A, 20B, 20C, 20D, glass sheets 22A, 22B, stiffeners 24A, 24B, and pre-cut sheets 26A, 26B, 26C, 26D layered into each of top and bottom molds 28, 30 using a resin 32 to define a mating perimeter 34 surrounding a depression 36 in said layered materials in each mold 28, 30. The molds 28, 30 are adapted to be mated together to engage the mating perimeters 34, and the depressions 36 define a core cavity 38. The molds 28, 30 are mounted to a mold bracket assembly 41 which enables the molds 28, 30 to be mated together after the blade 12 and materials are prepared. Each blade 12 further includes foam 40 disposed in the depressions 36 for filling the core cavity 38.

6 Claims, 8 Drawing Sheets

HELICOPTER BLADE AND METHOD OF MANUFACTURE

CROSS-REFERENCE TO RELATED APPLICATIONS

This application claims the benefit of U.S. Provisional Patent Application Serial No. 60/281,494, filed Apr. 4, 2001.

TECHNICAL FIELD

The subject invention relates to helicopters and particularly a helicopter blade assembly adapted to be used in a helicopter and the method of manufacturing such a blade.

BACKGROUND OF THE INVENTION

Helicopter blades have been one of the weaknesses of helicopter construction since the inception of the helicopter. The blades need to be lightweight and also need to maintain a desired shape and position. Conventionally blades are made from aluminum. Aluminum blades, however, have been difficult to maintain, particularly in areas where the blades are touched by people or objects. Aluminum blades are very easily dinged or misshapen from an ideal condition. Each variation from the desired shape causes potential vibration, ride discomfort and possible control problems with the helicopter in varying degrees.

Aluminum blades are also relatively more expensive than needed because of manufacturing techniques used to cant the blade to develop a twist in the blade so that a working area of the blade is isolated as a forced wing and the rest of the blade is stalled. Furthermore, the manufacturing technique places stresses on the blade that may affect the functionality of the blade.

Accordingly, there exists a need for a lightweight, yet durable helicopter blade that can also integrate the blade twist needed without stressing the blade in any significant manner. This need also must be accomplished in varying lengths to accommodate various types of helicopters and conditions of operation, as well as be relatively inexpensive to manufacture. More specifically, there is a need for a helicopter blade assembly that may be manufactured from a very small number of molding tools, thereby significantly reducing the cost of manufacturing and increasing the ease of assembly.

SUMMARY OF INVENTION

The present invention is a helicopter blade assembly for use on a helicopter. The assembly is a unitary panel when finally constructed, and can take impacts and even breakage while maintaining structural integrity. The blade can be designed with any twist desired without stressing the blade since the twist is set into the components prior to assembly.

The present invention provides a helicopter blade assembly that is relatively inexpensive to manufacture and can be constructed to a wide variety of specific lengths and designs without significant changes in assembly procedures beyond a different mold construction. Few molding tools are needed to manufacture the invention, resulting in reduced costs to the manufacturer and proportional cost reductions to the consumer.

The assembly process is also easier to pursue than the creation of a conventional blade since it includes a step with expanding foam that creates the final product from the inside of the blade and fills in any potential areas of void or weakness, as well as integrating the various components into a solid element of layers which remains integral even if all or a portion of one layer is damaged or removed, such as in the situation of impact with the blade, so that the helicopter can still fly in a controllable manner after the occurrence of such a condition.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
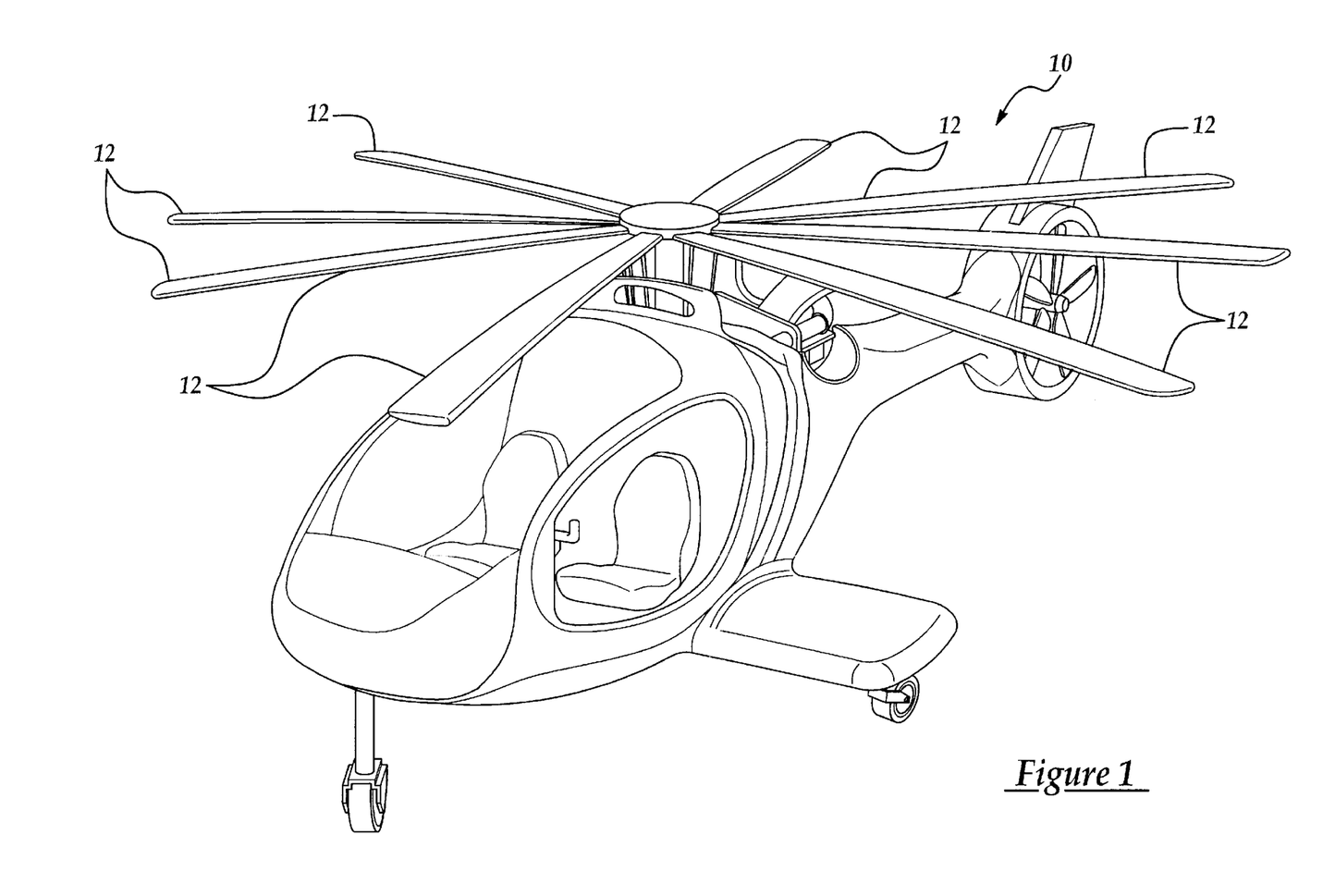
FIG. 1 is an elevational perspective view of a helicopter using the helicopter blade assembly constructed in accordance with the subject invention.

Referring to the Figures, wherein like numerals indicate like or corresponding parts throughout the several views, a helicopter 10 is shown in FIG. 1 having eight blades 12 thereon constructed pursuant to the present invention. The aerodynamic blade 12 is illustrated in FIGS. 2 through 25.

Each blade 12 includes a tip 14, a root 16, materials comprising skins 18A, 18B, reinforcement strips 20A, 20B, 20C, 20D, glass sheets 22A, 22B, stiffeners 24A, 24B, and pre-cut sheets 26A, 26B, 26C, 26D layered into each of top and bottom molds 28, 30 using a resin 32 to define a mating perimeter 34 surrounding a depression 36 in said layered materials in each mold 28, 30. The molds 28, 30 are adapted to be mated together to engage the mating perimeters 34, and the depressions 36 define a core cavity 38. For example, the molds 28, 30 are mounted to a mold bracket assembly 41 which enables the molds 28, 30 to be mated together after the blade 12 and materials are prepared. Each blade 12 further includes foam 40 disposed in the depressions 36. The foam 40 expands to fill the core cavity 38.

The blade 12 includes a rod 42 disposed in one of the molds 28, 30 to define a leading edge 44 and adhesively securing the rod 42 to the layered materials. A root insert support 46 is disposed in one of the molds 28, 30 to define a blade support 48 at the root end 16 and adhesively secure the insert support 46 to the layered materials. A tip weight 50 is disposed in one of the molds 28, 30 to define the tip end 14 and adhesively secure the tip weight 50 to the layered materials. The molds 28, 30 include helical surfaces 52 for mating the molds 28, 30 to mold the blade 12 with an aerodynamic twist between the tip 14 and root ends 16 thereof.

According to one embodiment, the blade 12 includes upper and lower skins 18A, 18B, the rod 42, the root insert support 46 with the post 54 and the tip weight 50. The blade 12 further includes a root end portion 56, a tip portion 58, a trailing edge portion 60, and an intermediate portion 62 using the top and bottom molds 28, 30 having stiffener grooves 64 disposed therein and cavities 38 defining corresponding root end 56, tip 58, trailing edge 60, and intermediate areas 62.

More specifically, the blade 12 includes the resin 32 applied over the top and bottom molds 28, 30. The upper skin 18A is disposed in the top mold 28. The lower skin 18B is disposed in the bottom mold 30. Reinforcement strips 20A, 20B, 20C, 20D are disposed over the upper skin 18A in the top mold 28. In addition, reinforcement strips 20A, 20B, 20C, 20D are disposed over the bottom skin 18B in the bottom mold 30.

Trailing edge reinforcement strips 20A, 20B are disposed in the trailing edge area 60 of the top mold 28 and in the trailing edge area 56 of the bottom mold 30. Tip reinforcement strips 20C, 20D are disposed in the tip area 58 of the top mold 28 and in the tip area 58 of the bottom mold 30.

Resin 32 is applied at the tip area 58 and the intermediate area 62 of the top mold 28 and at the tip area 58 and the intermediate area 62 of the bottom mold 30.

The first main glass sheet 22A is disposed over the reinforcement strips 20A, 20B, 20C, 20D in the top mold 28. Similarly, the second main glass sheet 22B is disposed over the reinforcement strips 20A, 20B, 20C, 20D in the bottom mold 30. The first and second stiffeners 24A, 24B are disposed on the first main glass sheet 22A in the top mold 28 and on the second main glass sheet 22B in the bottom mold 30. More particularly, the first and second stiffeners 24A, 24B may be disposed in the trailing edge area 60 of the top mold 28 and the trailing edge area 56 of the bottom mold 30. The first pre-cut sheet 26A is disposed over the stiffeners 24A, 24B in the top mold 28, and the second pre-cut sheet 26B is disposed over the stiffeners 24A, 24B in the bottom mold 30.

The rod 42 is disposed on one of the pre-cut sheets 26A, 26B to define the leading edge 44. The root insert support 46 is disposed on one of the pre-cut sheets 26A, 26B at the root end area 56 to define a support for the blade 12. The tip weight 50 is disposed on one of the pre-cut sheets 26A, 26B at the tip area 58 to define the tip 14 of the blade 12 and having an end of one of the second pre-cut sheets 26B folded over onto the tip weight 50. The adhesive is applied on the folded over end of the precut sheet 26B and the tip weight 50 for adhering the pre-cut sheet 26B to the tip weight 50.

A leading edge pre-cut sheet 26C is disposed on the rod 42. A trailing edge pre-cut sheet 26D is disposed on the trailing edge 60. One end of the sheet 26D is folded over and resin 32 is applied in the top mold 28 and in the bottom mold 30.

The upper skin 18A is mated with the lower skin 18B around the periphery of the mold cavities 28, 30 to define a core cavity 38 between the upper and lower skins 18A, 18B and a foam 40 including a foam catalyst 74 is disposed in the cavity 38 and expanded to fill the cavity 38. The resin 32 includes a resin catalyst to initiate curing. Once the resin 32 is cured, the top and bottom molds 28, 30 may be separated and the blade 12 removed.

Figure 2:
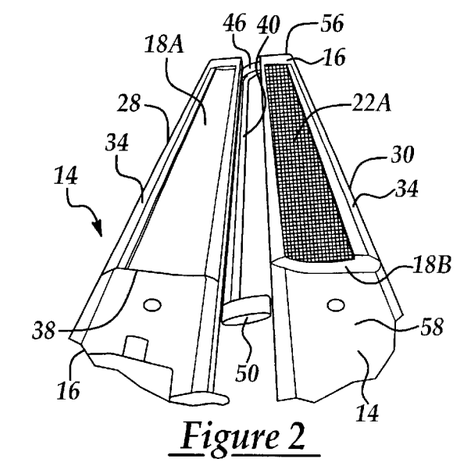
FIG. 2 is a perspective fragmentary view of the helicopter blade of FIG. 1 constructed in accordance with the subject inventions.
Figure 4:
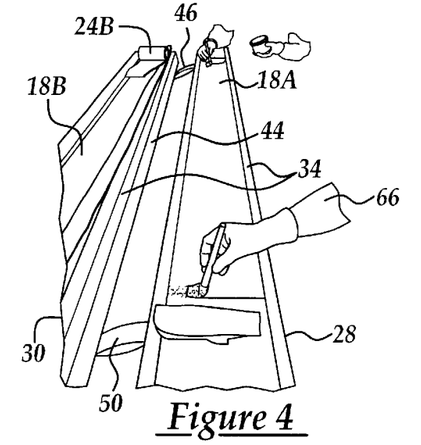
FIG. 4 is a perspective fragmentary view of the helicopter blade of FIG. 1 constructed in accordance with the subject inventions.
Figure 5:
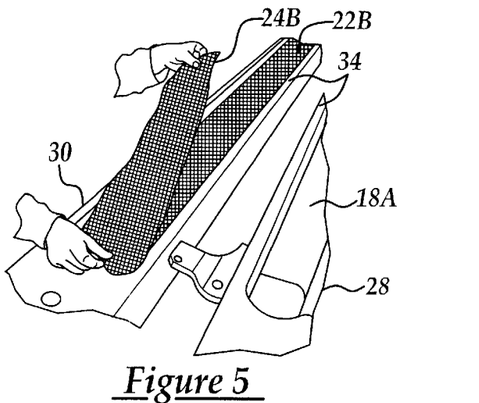
FIG. 5 is a perspective fragmentary view of the helicopter blade of FIG. 1 constructed in accordance with the subject inventions.

The preferred method of construction is illustrated in FIGS. 2 through 25. Referring to FIG. 2, a mold comprised of the top and bottom molds 28, 30 is constructed out of 7075T6 aluminum having a desired configuration. The top 28 is shown as a bare tool and the bottom 30 has a glass layup shown in the tool comprising a precut piece of fiberglass 22A as the main stringer for the blade. Two stiffeners 24A and 24B are also used in the method which are precut fiberglass pieces, as shown in FIGS. 5 and 6.

In FIG. 2, the precut fiberglass 22A is sized in the tool 30. FIG. 5 demonstrates the first stiffener precut glass 24A as it is also sized in the tool 30. The blade root 16 is also shown. FIG. 4 demonstrates that the precut strips 20A, 20B are rolled up and precut fiberglass strips for reinforcing the trailing edge 20A, 20B are sized and set into the bottom mold tool 30. Precut strips 20C, 20D are likewise sized and set into the tool 30 for reinforcement of the tip 14 of the blade 12, and a thickened fiberglass resin 32 is applied at the tip end 14 of the tool 28 and at an intermediate location 62. The thickened fiberglass resin 32 is a vinyl ester 72 with MEKP catalyst 74 made by Michigan Fiberglass as 8107772032 having a CAVASYL (fumed silica) thickener.

Figure 3:
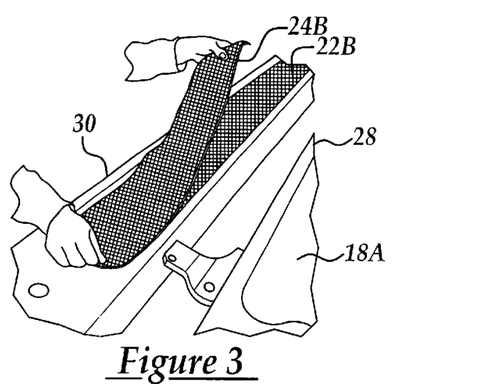
FIG. 3 is a perspective fragmentary view of the helicopter blade of FIG. 1 constructed in accordance with the subject inventions.
Figure 6:
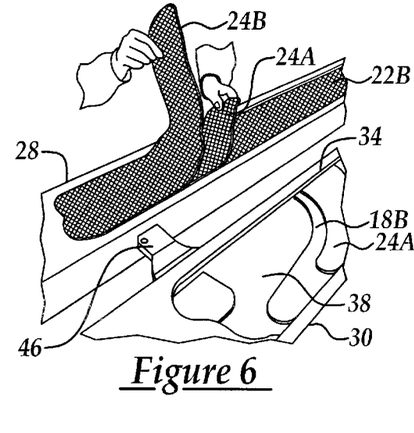
FIG. 6 is a perspective fragmentary view of the helicopter blade of FIG. 1 constructed in accordance with the subject inventions.
Figure 7:
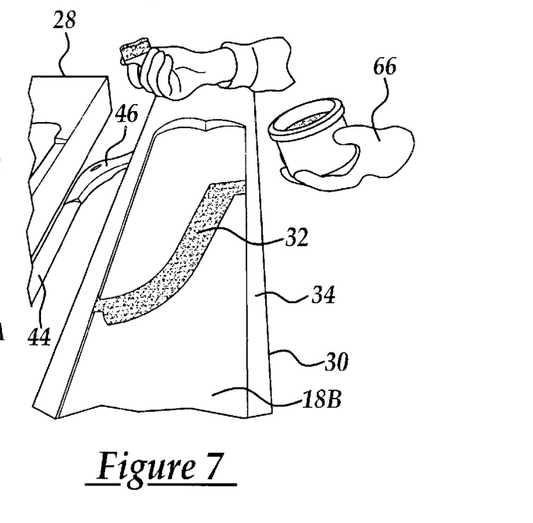
FIG. 7 is a perspective fragmentary view of the helicopter blade of FIG. 1 constructed in accordance with the subject inventions.
Figure 8A:
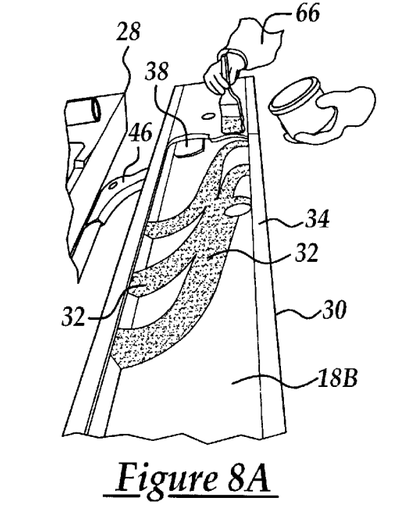
FIG. 8A is a perspective fragmentary view of the helicopter blade of FIG. 1 constructed in accordance with the subject inventions.

FIGS. 3 and 6 illustrate the next step of fitting the first root stiffener 24A, precut glass main sheet 22A, and the second root stiffener 24B in the tool 30. FIGS. 7 and 8A show the next step of placing resin 32 over stiffener grooves 64 which have been machined into the tool 30 for overlapping purposes with respect to the stiffeners 24A and 24B and main sheet 22A to assure that no bubbles occur at those edges on the blade 12.

Figure 8B:
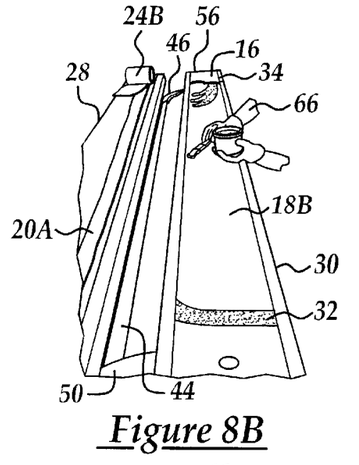
FIG. 8B is a perspective fragmentary view of the helicopter blade of FIG. 1 constructed in accordance with the subject inventions.
Figure 9A:
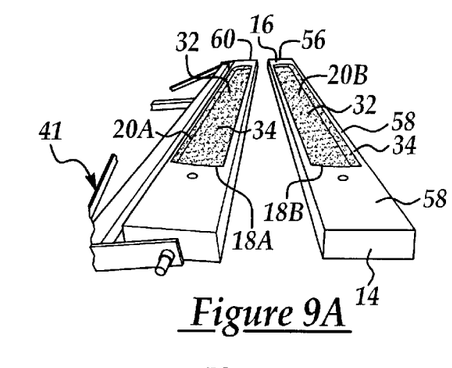
FIG. 9A is a perspective fragmentary view of the helicopter blade of FIG. 1 constructed in accordance with the subject inventions.
Figure 9B:
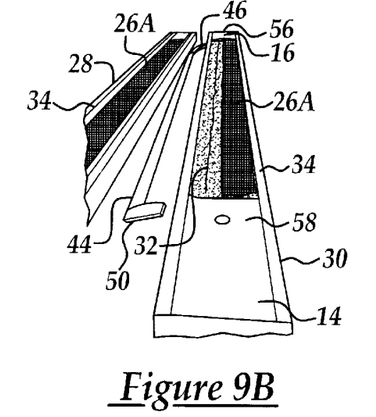
FIG. 9B is a perspective fragmentary view of the helicopter blade of FIG. 1 constructed in accordance with the subject inventions.
Figure 10:
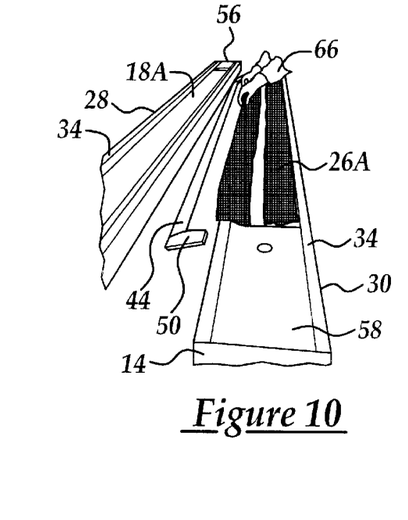
FIG. 10 is a perspective fragmentary view of the helicopter blade of FIG. 1 constructed in accordance with the subject inventions.
Figure 11:
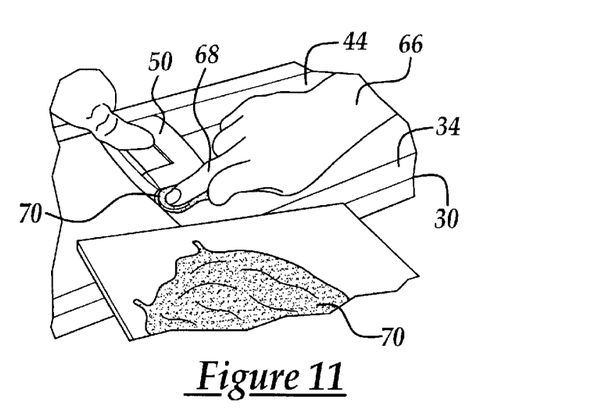
FIG. 11 is a perspective fragmentary view of the helicopter blade of FIG. 1 constructed in accordance with the subject inventions.

FIG. 8B represents the bare tools 28 and 30 as they are covered in resin 32 to help keep the air bubbles out of the fiberglass parts 22A, 24A, 24B when they are placed in the tool 28, 30. FIG. 9A shows that the stiffeners 24A, 24B and the main sheet 22B are placed onto the tool 28, as well as fiberglass strips 20A, 20B at the blade trailing edge 60 of each tool 28 and 30. FIG. 9B has three precut sheets 26A, 26B, 26C. The first sheet 26A is looped over itself as shown in FIG. 9B. FIG. 11 shows the leading edge 44 as fitted and the operator's 66 finger 68 is applying a slight bit of automotive grade bondo 70 at the tip weight end 50 of the blade 12. This insures that the tip weight 50 does not move or creates a small dam which holds the tip weight 50 snugly against the leading edge 44 so it cannot slide backwards in the tool 28. FIG. 10 shows the two other precut fiberglass sheets 26B, 26C at the leading edge 44 of the blade 12 which are used to wrap the leading edge 44 to bond the upper and lower skins 18A, 18B together. The other sheet 26A at the trailing edge 60 of the blade 12 is looped over itself to create a teardrop shape or a tubular shape. FIG. 10 shows all three of the sheets 26A, 26B, 26C.

Figure 12A:
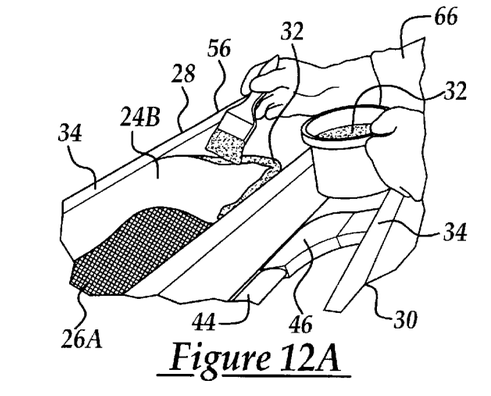
FIG. 12A is a perspective fragmentary view of the helicopter blade of FIG. 1 constructed in accordance with the subject inventions.
Figure 12B:
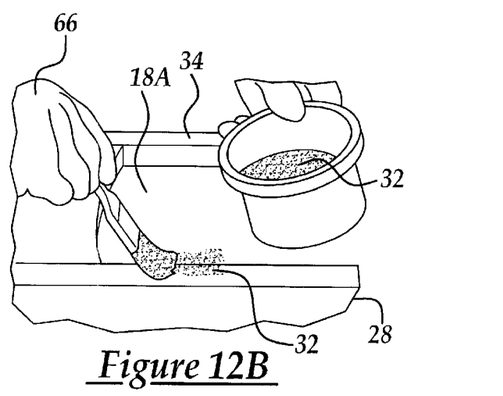
FIG. 12B is a perspective fragmentary view of the helicopter blade of FIG. 1 constructed in accordance with the subject inventions.

FIG. 12A shows the completed tool 28, 30 having resin 32 applied to the root end 16 of the tool 28, 30 to insure bonding between the root insert 46 and the fiberglass sheets bonding the skins 18A, 18B created around the root 16 of the blade 12. FIG. 12B also shows resin 32 being applied to the tip end 14 of the blade configuration in the mold 28, 30 so that the tip 14 gets bonded and sealed into the upper and lower skins 18A, 18B of the blade 12.

Figure 13A:
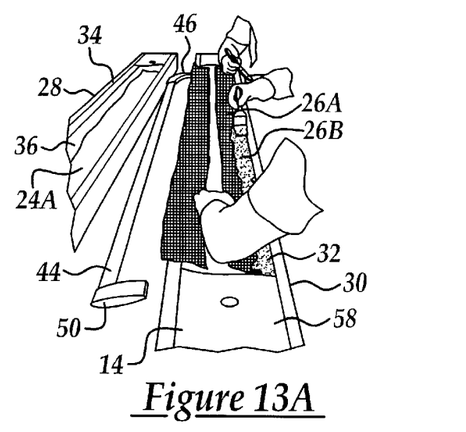
FIG. 13A is a perspective fragmentary view of the helicopter blade of FIG. 1 constructed in accordance with the subject inventions.
Figure 13B:
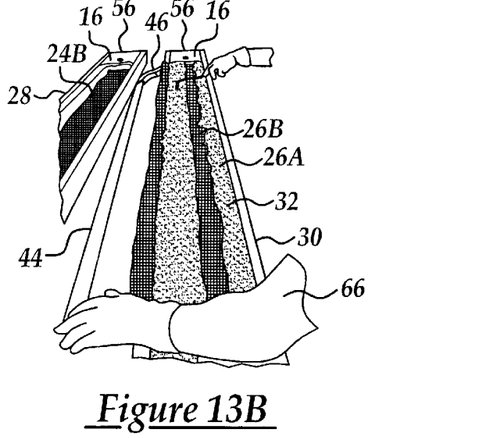
FIG. 13B is a perspective fragmentary view of the helicopter blade of FIG. 1 constructed in accordance with the subject inventions.

FIG. 13A takes the method further such that one of the precut strips 26A are each applied to the tool 30 on the leading and trailing edges 44, 60 of the tool 30. One of the precut strips 26A is also applied to the other tool 30 so that the method will double stack the precut strips 26A on the leading edge 44 between the molds 28, 30. FIG. 13B demonstrates a step where air is being removed by the operator 66 from the fiberglass precut strips 26A, 26B, 26C and resin 32 to insure proper bonding over the wetted areas.

Figure 14A:
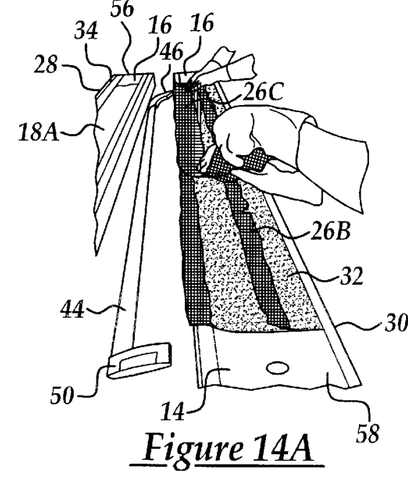
FIG. 14A is a perspective fragmentary view of the helicopter blade of FIG. 1 constructed in accordance with the subject inventions.
Figure 14B:
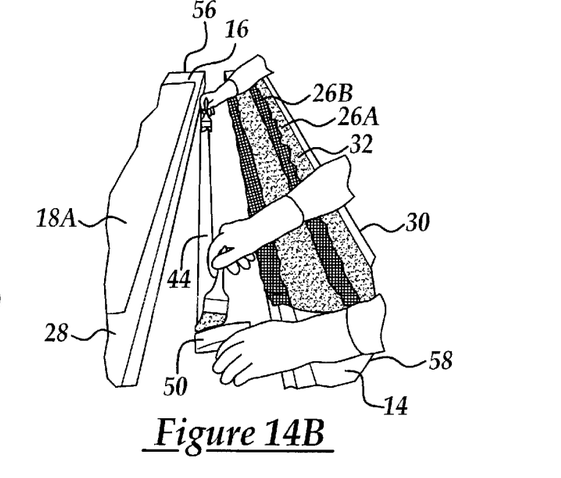
FIG. 14B is a perspective fragmentary view of the helicopter blade of FIG. 1 constructed in accordance with the subject inventions.

In FIG. 14A, the operator 66 takes the precut strip 26A that had been disposed on tool 28 and place it on tool 30. In FIG. 14B, resin 32 is subsequently applied to the leading edge 44, the tip weight 50, and the root 16 of the blade 12 to insure bonding to the precut fiberglass strips 26A, 26B, 26C that are placed in the leading edge 44 of the tool 30.

Figure 15A:
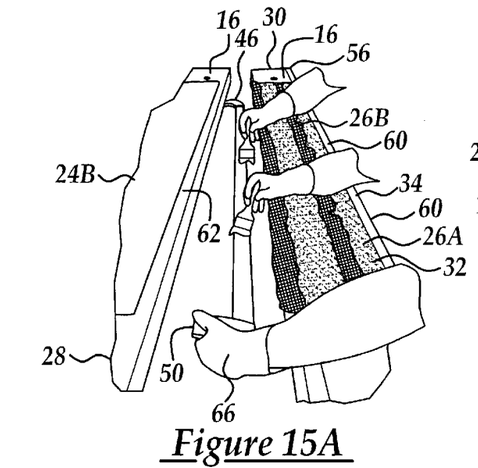
FIG. 15A is a perspective fragmentary view of the helicopter blade of FIG. 1 constructed in accordance with the subject inventions.
Figure 15B:
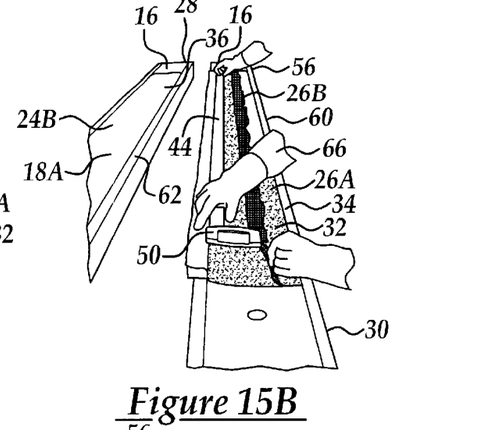
FIG. 15B is a perspective fragmentary view of the helicopter blade of FIG. 1 constructed in accordance with the subject inventions.
Figure 16A:
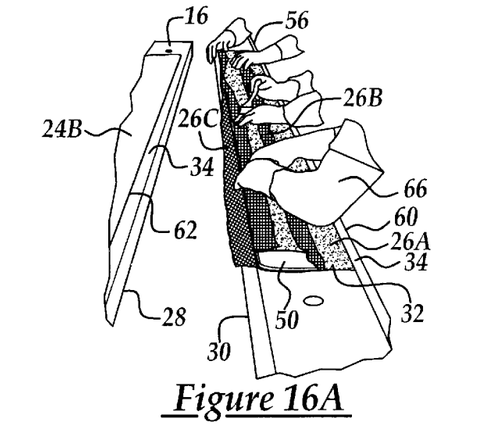
FIG. 16A is a perspective fragmentary view of the helicopter blade of FIG. 1 constructed in accordance with the subject inventions.
Figure 16B:
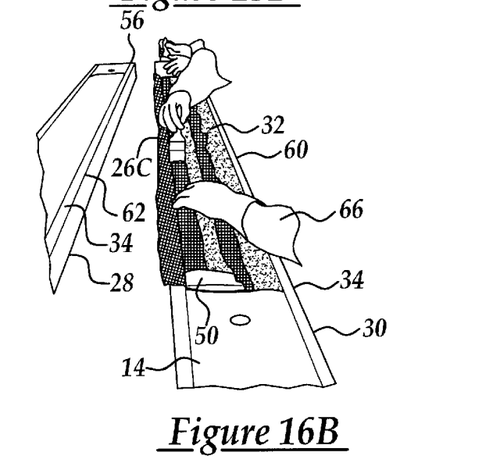
FIG. 16B is a perspective fragmentary view of the helicopter blade of FIG. 1 constructed in accordance with the subject inventions.
Figure 17A:
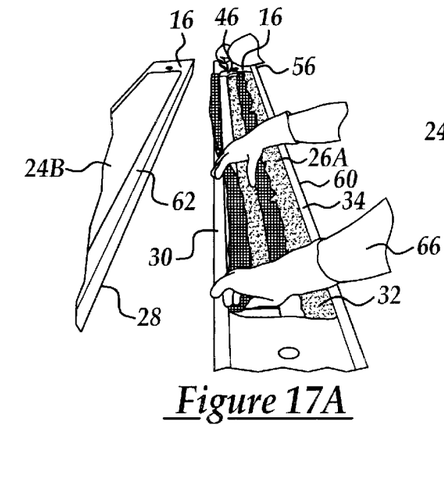
FIG. 17A is a perspective fragmentary view of the helicopter blade of FIG. 1 constructed in accordance with the subject inventions.

In FIG. 15A, resin 32 is placed on the backside of the leading edge 44, the tip weight 50, and the root 16 of the blade 12 and those elements are placed into the tool 30 in FIG. 15B. Precut strip 26B is then placed over the leading edge 44 in FIG. 16A and resin 32 being applied to that precut strip 26B for bonding as shown in FIG. 16B. FIG. 17A presents the folding over of the second layer of precut strip 26B folded over the leading edge 44, after air is removed from the first layer of precut strip 26A over the leading edge 44 by means of rollers.

Figure 17B:
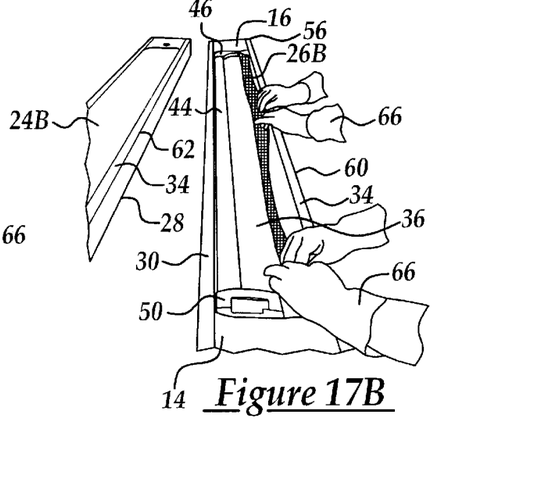
FIG. 17B is a perspective fragmentary view of the helicopter blade of FIG. 1 constructed in accordance with the subject inventions.
Figure 18A:
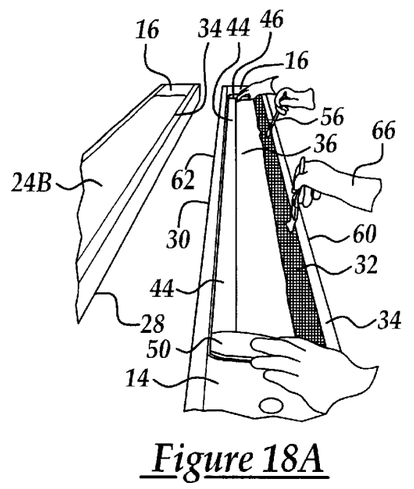
FIG. 18A is a perspective fragmentary view of the helicopter blade of FIG. 1 constructed in accordance with the subject inventions.
Figure 18B:
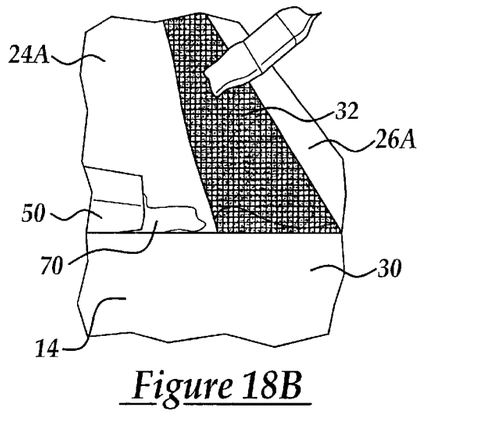
FIG. 18B is a perspective fragmentary view of the helicopter blade of FIG. 1 constructed in accordance with the subject inventions.

FIG. 17B shows the trailing edge 60 being folded over into its tubular or teardrop shape. Resin 32 is then applied to the precut 26C on the trailing edge 60 as shown in FIG. 18A. FIG. 18B shows how it looks after the resin 32 is applied. It is lightly patted on so as not to distort the teardrop or tubular shape of the precut strip 26C on the trailing edge 60. It also shows the bondo 70 used to hold the tip weight 50 in place. The bondo 70 is a two-part automotive grade hardener and cream placed in by a finger just enough to keep the tip weight 50 from moving around.

Figure 19A:
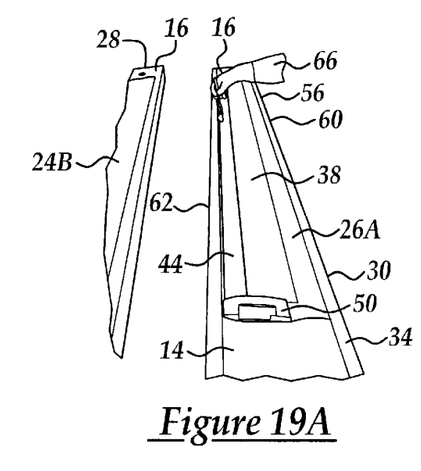
FIG. 19A is a perspective fragmentary view of the helicopter blade of FIG. 1 constructed in accordance with the subject inventions.
Figure 19B:
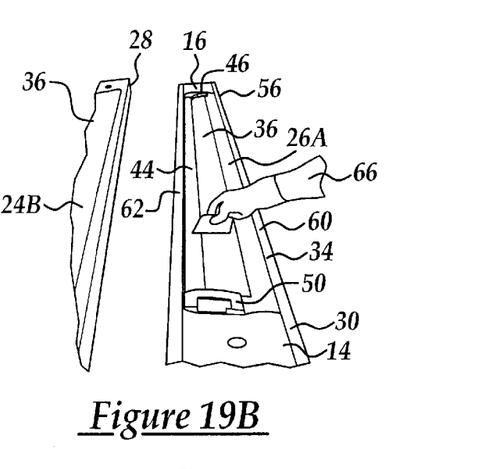
FIG. 19B is a perspective fragmentary view of the helicopter blade of FIG. 1 constructed in accordance with the subject inventions.
Figure 20A:
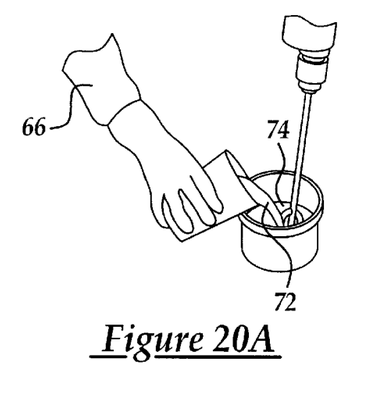
FIG. 20A is a perspective fragmentary view of the preparation of the foam comprising Part A and Part B.

FIG. 19A shows extra resin 32 on top of the assembly 10 to insure bonding. In FIG. 19B, the top precut strip 26A is then pre-lifted so that it can be pushed in the next step of the process against the opposite tool 28. In FIG. 20A, the foam 40 is created by mixing Part A 72 with Part B 74. The foam 40 is made by Michigan Fiberglass Company and is designated as a two-part expanding polyurethane foam 40 having a five-pound density. Part A 72 is designated as Part A and Part B 74 is designated as Part B.

Figure 20B:
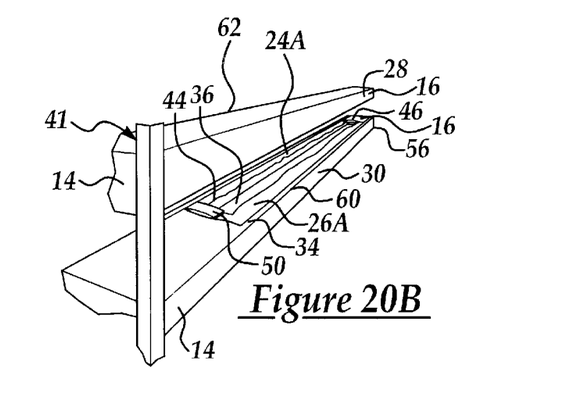
FIG. 20B is a perspective fragmentary view of the helicopter blade of FIG. 1 constructed in accordance with the subject inventions.
Figure 21:
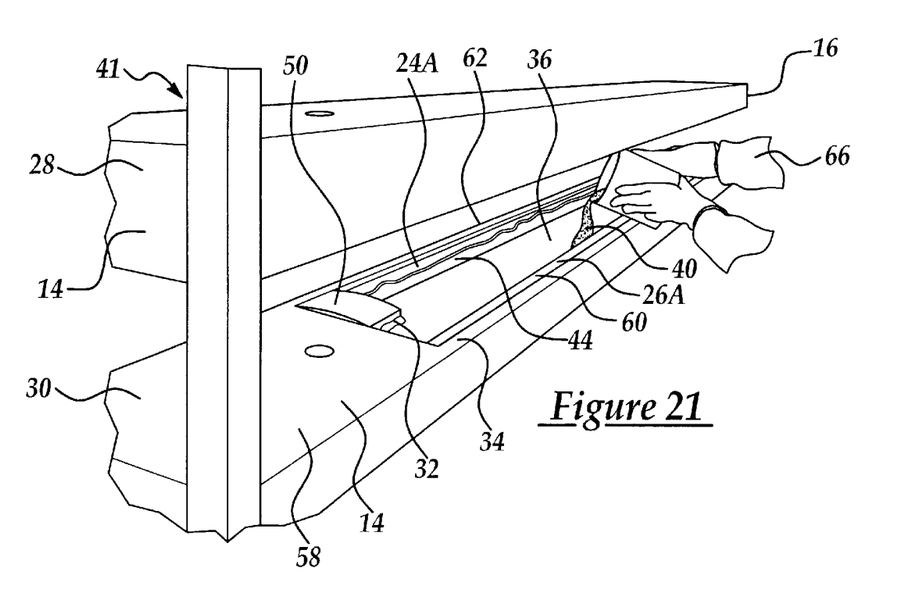
FIG. 21 is a perspective fragmentary view of the helicopter blade of FIG. 1 constructed in accordance with the subject inventions.
Figure 22:
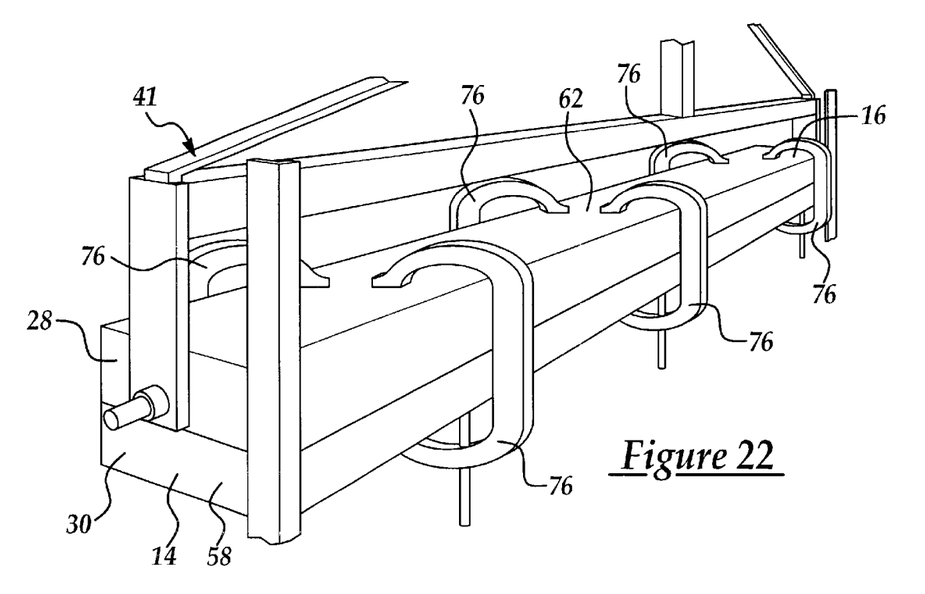
FIG. 22 is a perspective view of the top and bottom molds for constructing the helicopter blade of FIG. 1 in accordance with the subject inventions.
Figures 23A, 23B, 24:
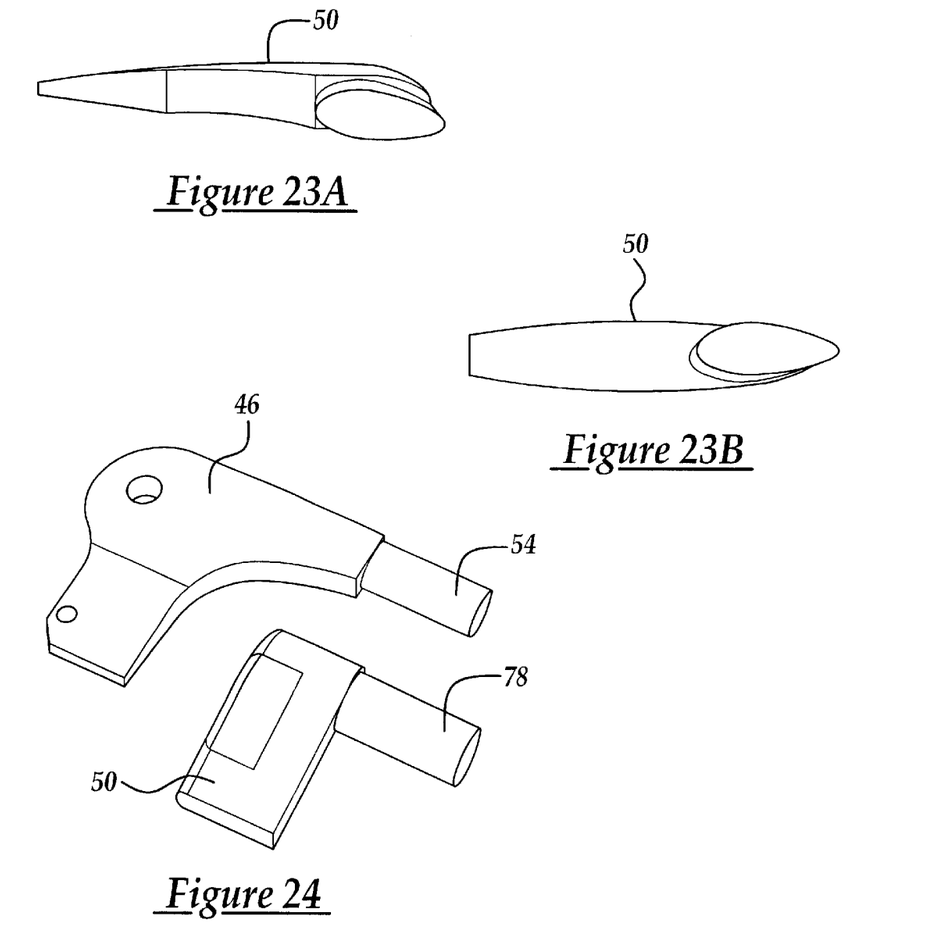
FIG. 23A is a perspective end view of the tip weight of the helicopter blade of FIG. 1.
FIG. 23B is a top view of the tip weight of the helicopter blade of FIG. 1.
FIG. 24 is a perspective side view of the root end and tip weight of the helicopter blade of FIG. 1.
Figure 25:
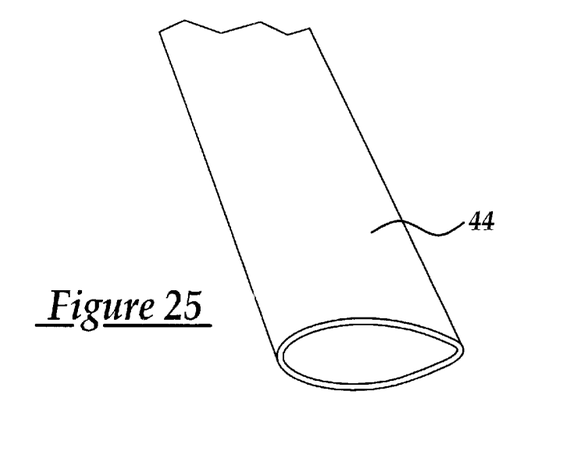
FIG. 25 is a perspective view of the leading edge of the helicopter blade of FIG. 1.

The tools 28 and 30 are then pre-staged in FIG. 20B to apply the foam 40 into the hollow core 38. The foam 40 is applied to the lower tool 30 in FIG. 21. It must be applied quickly from point of insertion until the mold 28, 30 is fully closed, since the foam 40 starts to grow and reaches a temperature of approximately 330 degrees Fahrenheit within sixty seconds. FIG. 22 illustrates the tools 28, 30 manually closed using clamps 76 to retain the upper 28 and lower tools 30 in position.

The blade 12 is then cooked into shape and integrated into a single piece assembly 10 where all of the layers and pieces are bonded together. The blade 12 can taken numerous impacts and retain its shape and functionality, while also retaining the functionality of the helicopter in a manner not previously seen in the art.

FIGS. 23A, 23B, 24, and 25 illustrate certain parts in more detail and the method of imparting the twist to the blade. The blade root 16 is constructed from 7075T6 aluminum and has a post 54 which mates with and is inserted into the leading edge 44 which is constructed from 4130 Chrome Moly steel. The tip weight 50 also has a post 78 which mates with and is inserted into the other end of the leading edge 44. In comparison, the posts 54, 78 of the two parts 16, 50 are rotatably offset approximately eight degrees which, in turn, imparts an eight-degree twist to the blade 12, as discussed above. This twist is also machined into the mold tools 28 and 30. In the assembly, this results in no stresses, since the twist is built into the final part without post assembly processing.

What is claimed is:

1. An aerodynamic blade including an upper and a lower skin, a rod, a support root insert with a post and a tip weight, a root end portion, a tip portion, a trailing edge portion and an intermediate portion using a top mold and a bottom mold having stiffener grooves disposed therein and cavities defining corresponding root end, tip, trailing edge and intermediate areas, said blade comprising:

a resin applied over said top and bottom molds;
   an upper skin disposed in said top mold;
   a lower skin disposed in said bottom mold;
   reinforcement strips disposed over said upper skin in said top mold;
   reinforcement strips disposed over said bottom skin in said bottom mold;
   a first main glass sheet disposed over said reinforcement strips in said top mold;
   a second main glass sheet disposed over said reinforcement strips in said bottom mold;
   first and second stiffeners disposed on said first main glass sheet in said top mold;
   first and second stiffeners disposed on said second main glass sheet in said bottom mold;
   a first pre-cut sheet disposed over said stiffeners in said top mold;
   a second pre-cut sheet disposed over said stiffeners in said bottom mold;
   a rod disposed on one of said pre-cut sheets to define a leading edge;
   a root insert support disposed on one of said pre-cut sheets at said root end area to define a support for said blade;
   a tip weight disposed on one of said pre-cut sheets at said tip area to define said tip of said blade and having an end of one of said second pre-cut sheets 9 folded over onto said tip weight;
   adhesive applied on said folded over end of said pre-cut sheet and said tip weight for adhering said pre-cut sheet to said tip weight;
   a leading edge pre-cut sheet disposed on said rod;
   a trailing edge pre-cut sheet disposed on said trailing edge and folding over one end of said sheet;
   resin applied in said top mold;
   resin applied in said bottom mold;
   wherein said upper skin is mated with said lower skin around said periphery of said mold cavities to define a core cavity between said upper and lower skins with said core cavity having foam disposed therein.

2. An aerodynamic blade including an upper and a lower skin, a rod, a support root insert with a post and a tip weight, a root end portion, a tip portion, a trailing edge portion and an intermediate portion using a top mold and a bottom mold having stiffener grooves disposed therein and cavities defining corresponding root end, tip, trailing edge and intermediate areas, said blade comprising:

an upper skin disposed in said top mold;
   a lower skin disposed in said bottom mold;
   resin including applied on said stiffener grooves;
   trailing edge reinforcement strips disposed in said trailing edge area of said top mold;
   trailing edge reinforcement strips disposed in said trailing edge area of said bottom mold;
   tip reinforcement strips disposed in said tip area of said top mold;
   tip reinforcement strips disposed in said tip area of said bottom mold;
   resin applied at said tip area and said intermediate area of said top mold;
   resin applied at said tip area and said intermediate area of said bottom mold;
   a first main glass sheet disposed in said top mold;
   a second main glass sheet disposed in said bottom mold;
   first and second stiffeners disposed in said root end area of said top mold;
   first and second stiffeners disposed in said root end area of said bottom mold;
   a first pre-cut sheet disposed into said top mold;
   a second pre-cut sheet disposed into said bottom mold;
   a rod disposed on said first pre-cut sheet to define a leading edge;
   a root insert support disposed on said first pre-cut sheet for defining said support for said blade;
   a tip weight disposed on said first pre-cut sheet to define said tip of said blade and having an end of said first pre-cut sheet folded over onto said tip weight;
   adhesive applied on said folded over end of said pre-cut sheet and said tip weight for adhering said pre-cut sheet to said tip weight;
   a leading edge pre-cut sheet disposed on said rod;
   a trailing edge pre-cut sheet disposed on said trailing edge and folding over one end of said sheet;
   resin applied to said root insert support, said rod and said tip portion;
   wherein said upper skin is mated with said lower skin around said periphery of said mold cavities to define a core cavity between said upper and lower skins with said core cavity having foam disposed therein.

3. An aerodynamic blade including an upper and a lower skin, a rod, a support root insert with a post and a tip weight, a root end portion, a tip portion, a trailing edge portion and an intermediate portion using a top mold and a bottom mold having stiffener grooves disposed therein and cavities defining corresponding root end, tip, trailing edge and intermediate areas, said blade comprising:

a resin a catalyst applied over said top and bottom molds;
   an upper skin disposed in said top mold;
   a lower skin disposed in said bottom mold;
   resin applied on said stiffener grooves;
   trailing edge reinforcement strips disposed in said trailing edge area of said top mold;

trailing edge reinforcement strips disposed in said trailing edge area of said bottom mold;

tip reinforcement strips disposed in said tip area of said top mold;

tip reinforcement strips disposed in said tip area of said bottom mold;

resin applied at said tip area and said intermediate area of said top mold;

resin applied at said tip area and said intermediate area of said bottom mold;

a first main glass sheet disposed in said top mold;

a second main glass sheet disposed in said bottom mold;

first and second fiberglass stiffeners disposed in said root end area of said top mold;

first and second fiberglass stiffeners disposed in said root end area of said bottom mold;

a first pre-cut sheet disposed into said top mold;

a second pre-cut sheet disposed into said bottom mold;

a rod disposed on said first pre-cut sheet to define a leading edge;

a root insert support disposed on said first pre-cut sheet in said root end area for defining said support for said blade;

a tip weight disposed on said first pre-cut sheet in said tip area to define said tip of said blade and having an end of said first pre-cut sheet folded over onto said tip weight;

adhesive applied on said folded over end of said pre-cut sheet and said tip weight for adhering said pre-cut sheet to said tip weight;

a leading edge pre-cut sheet disposed on said rod;

a trailing edge pre-cut sheet disposed on said trailing edge and folding over one end of said sheet;

resin applied to said root insert support, said rod and said tip portion;

wherein said upper skin is mated with said lower skin around said periphery of said mold cavities to define a core cavity between said upper and lower skins with said core cavity having foam disposed therein.

4. A method of making a helicopter blade including an upper and a lower skin, a rod, a support root insert with a post and a tip weight with a post, a root end portion, a tip portion, a trailing edge portion and an intermediate portion using a top mold and a bottom mold having stiffener grooves disposed therein and cavities defining corresponding root end, tip, trailing edge and intermediate areas, said method comprising the steps of:

applying a resin over the top and bottom molds;

disposing an upper skin in the top mold;

disposing a lower skin in the bottom mold;

disposing reinforcement strips over the upper skin in the top mold;

disposing reinforcement strips over the bottom skin in the bottom mold;

disposing a first main glass sheet over the reinforcement strips in the top mold;

disposing a second main glass sheet over the reinforcement strips in the bottom mold;

disposing first and second stiffeners on the first main glass sheet in the top mold;

disposing first and second stiffeners on the second main glass sheet in the bottom mold;

disposing a first pre-cut sheet over the stiffeners in the top mold;

disposing a second pre-cut sheet over the stiffeners in the bottom mold;

disposing a rod on one of the pre-cut sheets to define a leading edge;

disposing a root insert support on one of the pre-cut sheets at the root end area to define a support for the blade;

disposing a tip weight on one of the pre-cut sheets at the tip area to define the tip of the blade;

folding over an end of one of the said second pre-cut sheets onto the tip weight;

applying adhesive on the folded over end of the pre-cut sheet and the tip weight for adhering the pre-cut sheet to the tip weight;

disposing a leading edge pre-cut sheet on the rod;

disposing a trailing edge pre-cut sheet on the trailing edge and folding over one end of the sheet;

applying resin in the top mold;

applying resin in the bottom mold;

forcing air from the pre-cut sheets;

placing the top mold over the bottom mold;

mating the upper and lower skins around the periphery of the mold cavities to define a core cavity between the upper and lower skins;

expanding foam in the core cavity;

curing the adhesive;

separating the top and bottom molds, and removing the blade from the molds.

5. A method of making a helicopter blade including an upper and a lower skin, a rod, a support root insert with a post and a tip weight, a root end portion, a tip portion, a trailing edge portion and an intermediate portion using a top mold and a bottom mold having stiffener grooves disposed therein and cavities defining corresponding root end, tip, trailing edge and intermediate areas , said method comprising the steps of:

disposing an upper skin in the top mold;

disposing a lower skin in the bottom mold;

applying resin on the stiffener grooves;

disposing trailing edge reinforcement strips in the trailing edge area of the top mold;

disposing trailing edge reinforcement strips in the trailing edge area of the bottom mold;

disposing tip reinforcement strips in the tip area of the top mold;

disposing tip reinforcement strips in the tip area of the bottom mold;

applying resin at the tip area and the intermediate area of the top mold;

applying resin at the tip area and the intermediate area of the bottom mold;

disposing a first main glass sheet in the top mold;

disposing a second main glass sheet in the bottom mold;

disposing first and second stiffeners in the root end area of the top mold;

disposing first and second stiffeners in the root end area of the bottom mold;

disposing a first pre-cut sheet into the top mold;

disposing a second pre-cut sheet into the bottom mold;

disposing a rod on the first pre-cut sheet to define a leading edge;

disposing a root insert support on the first pre-cut sheet for defining the support for the blade;

disposing a tip weight on the first pre-cut sheet to define the tip of the blade;

folding over an end of the first pre-cut sheet onto the tip weight;

applying adhesive on the folded over end of the pre-cut sheet and the tip weight for adhering the pre-cut sheet to the tip weight;

disposing a leading edge pre-cut sheet on the rod;

disposing a trailing edge pre-cut sheet on the trailing edge and folding over one end of the sheet;

applying resin to the root insert support, the rod and the tip portion;

forcing air from the pre-cut sheets;

placing the top mold over the bottom mold;

mating the upper and lower skins around the periphery of the mold cavities to define a core cavity between the upper and lower skins;

expanding foam in the core cavity;

curing the adhesive;

separating the top and bottom molds, and removing the blade from the molds.

6. A method of making a helicopter blade including an upper and a lower skin, a rod, a support root insert with a post and a tip weight, a root end portion, a tip portion, a trailing edge portion and an intermediate portion using a top mold and a bottom mold having stiffener grooves disposed therein and cavities defining corresponding root end, tip, trailing edge and intermediate areas, said method comprising the steps of:

applying a resin over the top and bottom molds;

disposing an upper skin in the top mold;

disposing a lower skin in the bottom mold;

sizing first and second main glass sheets;

sizing two first stiffeners;

sizing two second stiffeners;

sizing tip reinforcement strips;

sizing trailing edge reinforcement strips;

applying resin on the stiffener grooves;

disposing the trailing edge reinforcement strips in the trailing edge area of the top mold;

disposing the trailing edge reinforcement strips in the trailing edge area of the bottom mold;

disposing the tip reinforcement strips in the tip area of the top mold;

disposing the tip reinforcement strips in the tip area of the bottom mold;

applying resin at the tip area and the intermediate area of the top mold;

applying resin at the tip area and the intermediate area of the bottom mold;

disposing the first main glass sheet in the top mold;

disposing the second main glass sheet in the bottom mold;

disposing the first and second fiberglass stiffeners in the root end area of the top mold;

disposing the first and second fiberglass stiffeners in the root end area of the bottom mold;

disposing a first pre-cut sheet into the top mold;

disposing a second pre-cut sheet into the bottom mold;

disposing a rod on the first pre-cut sheet to define a leading edge;

disposing a root insert support on the first pre-cut sheet in the root end area for defining the support for the blade;

disposing a tip weight on the first pre-cut sheet in the tip area to define the tip of the blade;

folding over an end of the first pre-cut sheet onto the tip weight;

applying adhesive on the folded over end of the pre-cut sheet and the tip weight for adhering the pre-cut sheet to the tip weight;

disposing a leading edge pre-cut sheet on the rod;

disposing a trailing edge pre-cut sheet on the trailing edge and folding over one end of the sheet;

applying resin to the root insert support, the rod and the tip portion;

forcing air from the pre-cut sheets with rollers;

placing the top mold over the bottom mold;

mating the upper and lower skins around the periphery of the mold cavities to define a core cavity between the upper and lower skins;

expanding foam in the core cavity;

curing the adhesive;

separating the top and bottom molds; and removing the blade from the molds.

* * * * *